US010414693B2

(12) United States Patent
Andrews et al.

(10) Patent No.: US 10,414,693 B2
(45) Date of Patent: Sep. 17, 2019

(54) COMPOSITION FOR TREATMENT OF FLUE GAS WASTE PRODUCTS

(71) Applicants: Dale C. Andrews, Bethel Park, PA (US); Lance Olson, Cranberry Township, PA (US)

(72) Inventors: Dale C. Andrews, Bethel Park, PA (US); Lance Olson, Cranberry Township, PA (US)

(73) Assignee: Carmeuse North America, Pittsburgh, PA (US)

( * ) Notice: Subject to any disclaimer, the term of this patent is extended or adjusted under 35 U.S.C. 154(b) by 0 days.

(21) Appl. No.: 16/043,840

(22) Filed: Jul. 24, 2018

(65) Prior Publication Data
US 2019/0023615 A1 Jan. 24, 2019

Related U.S. Application Data

(60) Provisional application No. 62/536,184, filed on Jul. 24, 2017.

(51) Int. Cl.
| | |
|---|---|
| *C04B 28/14* | (2006.01) |
| *B01D 53/73* | (2006.01) |
| *B09B 1/00* | (2006.01) |
| *B09B 3/00* | (2006.01) |
| *B09B 5/00* | (2006.01) |
| *C04B 28/02* | (2006.01) |
| *B01D 53/50* | (2006.01) |
| *C04B 111/00* | (2006.01) |
| *B01D 53/80* | (2006.01) |

(52) U.S. Cl.
CPC ............ *C04B 28/144* (2013.01); *B01D 53/73* (2013.01); *B09B 1/00* (2013.01); *B09B 3/0025* (2013.01); *B09B 3/0083* (2013.01); *B09B 5/00* (2013.01); *C04B 28/021* (2013.01); *B01D 53/501* (2013.01); *B01D 53/80* (2013.01); *B01D 2251/404* (2013.01); *B01D 2251/604* (2013.01); *B01D 2251/606* (2013.01); *B01D 2257/302* (2013.01); *B01D 2257/60* (2013.01); *B01D 2257/602* (2013.01); *C04B 2111/00784* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,354,876 | A | 10/1982 | Webster | |
| 4,626,264 | A * | 12/1986 | Stehning | C01F 11/464 55/440 |
| 5,575,984 | A * | 11/1996 | Bresowar | B01D 53/501 422/170 |
| 5,700,107 | A * | 12/1997 | Newton | B09C 1/08 106/705 |
| 5,770,164 | A * | 6/1998 | Moser | B01D 53/502 261/115 |
| 5,820,831 | A * | 10/1998 | Bresowar | B01D 53/501 422/171 |
| 5,888,256 | A | 3/1999 | Morrison | |
| 5,997,629 | A * | 12/1999 | Hills | B09C 1/08 106/692 |
| 6,177,052 | B1 * | 1/2001 | Weichs | B01D 53/08 366/186 |
| 7,887,769 | B1 * | 2/2011 | Smith | B01D 53/502 423/164 |
| 2006/0183957 | A1 * | 8/2006 | Forrester | A62D 3/33 588/256 |
| 2006/0189837 | A1 * | 8/2006 | Forrester | A62D 3/33 588/256 |
| 2011/0061598 | A1 | 3/2011 | Boxley et al. | |
| 2014/0005461 | A1 | 1/2014 | Golub | |
| 2014/0256603 | A1 * | 9/2014 | Muthusamy | C09K 8/601 507/211 |
| 2017/0113085 | A1 * | 4/2017 | Raythatha | B09B 3/0008 |
| 2018/0050946 | A1 * | 2/2018 | Corazza | B09B 3/0041 |

FOREIGN PATENT DOCUMENTS

WO 1992022510 A1 12/1992

OTHER PUBLICATIONS

Nagrockiene, D. et al., "Influence of Biofuel Combustion Fly Ash on the Properties of Concrete," Construction Science, Dec. 2015, vol. 18/1, p. 18-23.

Wang, L. et al, "Research and Preparation of Self-Leveling Floor Mortar from Fluor-Gypsum Waste Slag," J. Minearl Petrol, Jun. 2012, vol. 32, Issue 2, p. 7-11, abstract.

* cited by examiner

*Primary Examiner* — Kyle Armstrong
(74) *Attorney, Agent, or Firm* — Cohen & Grigsby, PC

(57) ABSTRACT

Compositions for the treatment of flue gas desulfurization scrubber effluent may generally comprise, based on weight percent of the composition, at least 50% fly ash, up to 20% calcium oxide and/or calcium hydroxide, up to 2% plasticizer and a balance of incidental impurities. Methods for the treatment of flue gas desulfurization scrubber effluent using the composition for the treatment of flue gas desulfurization scrubber effluent are also described.

19 Claims, No Drawings

COMPOSITION FOR TREATMENT OF FLUE GAS WASTE PRODUCTS

CROSS-REFERENCE TO RELATED APPLICATION

This application claims priority to U.S. provisional application Ser. No. 62/536,184, filed on Jul. 24, 2017, which is hereby incorporated by reference in its entirety.

FIELD OF INVENTION

The present invention relates to compositions for the treatment of flue gas desulfurization scrubber effluent and methods of making and using the same.

BACKGROUND

Coal-fired electric utility power plants may produce solid waste, slurry waste, and flue gas, which may be emitted to the atmosphere. Coal-fired power plants may remove sulfur dioxide ($SO_2$) from the flue gas by using flue gas desulfurization systems. An example of a flue gas desulfurization system is a wet scrubber. Wet scrubber systems may inject aqueous slurry of an alkaline sorbent, such as limestone ($CaCO_3$) and a lime-based slurry ($Ca(OH)_2$), into the flue gas to capture the $SO_2$ and produce flue gas desulfurization scrubber effluent.

The flue gas desulfurization scrubber effluent may include a mixture of liquid waste and solid waste, such as calcium sulfite, calcium sulfate, chlorides, heavy metals and other by-products. The effluent may be disposed in a landfill or an impoundment. However, this may create secondary environmental risks, such as pollution of ground liquid and surface liquid, e.g., water, due to infiltration into underlying soils and free liquid emitting to the surface as well as a potential breach of the impoundment resulting in uncontrolled spills. Proposed regulations by some federal and state agencies may restrict or prohibit disposal of the flue gas desulfurization scrubber effluent into impoundments. Other conventional methods may require drying the effluent and transporting the dried effluent by conveyor or truck to the landfill which may also require additional spreading and compaction.

Accordingly, more efficient and/or cost-effective methods for treating flue gas desulfurization scrubber effluent are desirable.

SUMMARY

A composition for the treatment of flue gas desulfurization scrubber effluent may generally comprise, based on weight percent of the composition, at least 50% fly ash, up to 20% calcium oxide and/or calcium hydroxide, up to 2% plasticizer and a balance of incidental impurities.

A method for the treatment of flue gas desulfurization scrubber effluent may generally comprise contacting flue gas desulfurization scrubber effluent having greater than 5000 ppm dissolved sulfite and/or sulfate and a composition for the treatment of flue gas desulfurization scrubber effluent comprising, based on weight percent of the composition, at least 50% fly ash, up to 20% calcium oxide and/or calcium hydroxide, up to 2% plasticizer, and a balance of incidental impurities.

DETAILED DESCRIPTION

All numerical quantities stated herein are approximate, unless indicated otherwise, and are to be understood as being prefaced and modified in all instances by the term "about". The numerical quantities disclosed herein are to be understood as not being strictly limited to the exact numerical values recited. Instead, unless indicated otherwise, each numerical value included in this disclosure is intended to mean both the recited value and a functionally equivalent range surrounding that value.

All numerical ranges recited herein include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value equal to or less than 10.

As generally used herein, the articles "one", "a", "an", and "the" include "at least one" or "one or more" of what is claimed or described, unless indicated otherwise. For example, "a component" means one or more components, and thus, possibly, more than one component is contemplated and may be employed or used in an implementation of the described embodiments.

As generally used herein, the terms "include", "includes", and "including" are meant to be non-limiting.

As generally used herein, the terms "have", "has", and "having" are meant to be non-limiting.

As generally used herein, the term "characterized by" is meant to be non-limiting.

As generally used herein, a "Newtonian fluid" refers to a fluid or paste having a viscosity, within a range of specified shear rates at a specified temperature, which is a substantially constant value.

As generally used herein, a "non-Newtonian fluid" refers to a fluid or paste that is not a "Newtonian fluid". The non-Newtonian fluid may be characterized by pseudoplastic behavior, thixotropic behavior, and/or lacking ideal viscosity behavior on flow.

As generally used herein, "cure" refers to the length of time for a material to achieve a self-supporting state or the change in physical properties of the material to the self-supporting state.

The present invention relates to compositions for the treatment of flue gas desulfurization scrubber effluent and methods of making and using the same. The compositions for the treatment of flue gas desulfurization scrubber effluent and methods of using the same described herein may fixate and encapsulate the effluent such that the resultant mixture may comprise a non-Newtonian paste that may be pumped to a landfill. Once the paste exits the pipe at the landfill, it may flow and self-level until its internal stresses reach equilibrium. The composition may be used to provide appreciable hardening or structural characteristics of the effluent when cured in the landfill. The partially or completely cured effluent may be generally referred to as a "lift". Without wishing to be bound to any particular theory, it is believed that the paste may harden or stiffen as the quicklime and fly ash in the composition continue to react until such time that the paste withstands the internal stresses sufficient to support one or more subsequent lifts. The subsequent lift may comprise an effluent having lower strength and/or lower viscosity relative to the immediately preceding lift. The subsequent lift may be added on top of the preceding lift.

The composition for the treatment of flue gas desulfurization scrubber effluent may improve the structural stability, i.e., load-bearing, of the effluent and/or reduce leachability when the treated effluent partially or completely cures. Without wishing to be bound to any particular theory, it is believed that the addition of calcium oxide and fly ash to the effluent may precipitate and/or fixate leachable compounds therein, such as lead, cadmium, and chromium, to reduce leachability. The treatment of the flue gas desulfurization scrubber effluent with the composition described herein may form a pumpable mixture that stabilizes in days or weeks, and may comprise non-biologic or biologic, organic or inorganic, liquid soluble and/or insoluble compounds.

The method may include contacting a composition for the treatment of flue gas desulfurization scrubber effluent as generally described herein to form a non-Newtonian paste, pumping the paste to a landfill, and curing the paste under atmospheric conditions (without the adjustment of temperature, humidity, or pressure) to form an environmentally acceptable, load-bearing lift. The atmospheric conditions may depend on the location of the landfill. The lift may be characterized by permeability of less than $10^{-5}$ cm/sec.

The composition for the treatment of flue gas desulfurization scrubber effluent may comprise, based on weight percent of the composition, at least 50% fly ash, up to 20% calcium oxide and/or calcium hydroxide, up to 2% plasticizer and a balance of incidental impurities. The composition may comprise, based on weight percent of the composition, from 50-98%, 50-80%, 50-72%, 61-83%, 72-98%, 80-98%, 82-96%, 84-94%, 86-92%, 88-90%, 80-90%, 80-85%, 85-90%, 90-98%, and 95-98% fly ash. The composition may comprise, based on weight percent of the composition, from up to 20%, 2-15%, 4-13%, 6-11%, 8-9%, 2-8%, and 8-15% calcium oxide. The composition may comprise, based on weight percent of the composition, from up to 20%, 3-18%, 5-16%, 7-14%, 9-12%, 3-11%, 3-11%, and 10-18% calcium hydroxide. The composition may comprise based on weight percent of the composition, greater than zero up to 2%, 0.5-1.0%, 0.1-0.5% plasticizer. The composition may comprise, based on weight percent of the composition, at least 83.5% fly ash, up to 15% calcium oxide and/or calcium hydroxide, up to 1.5% plasticizer, and a balance of incidental impurities. The composition may comprise, based on weight percent of the composition, at least 86% fly ash, up to 13% calcium oxide and/or calcium hydroxide, up to 1% plasticizer, and a balance of incidental impurities. The composition may lack one of calcium oxide and calcium hydroxide other than as incidental impurities.

The fly ash may comprise Class F fly ash and/or Class C fly ash. Class F fly ash and Class C fly ash may be generally defined by ASTM C618-17a. Class F fly ash may be produced from bituminous or brown coal and is mainly siliceous. Class F fly ash may be pozzolanic in nature, and contains less than 20% lime (CaO) and at least 70% of silicon oxide, aluminum oxide, and iron oxide. Class C fly ash may be derived from sub-bituminous and lignite coal. Class C fly ash is rich with calcium oxide and generally contains more than 20% lime (CaO). For comparison, the typical content calcium oxide in class F fly ash may be between 2-4% and may be generally lower than 10%, while the typical content of calcium oxide in class C fly ash may be between 10% and 20% and may be as high as 26%.

The calcium oxide may comprise quicklime and/or hydrated lime. Calcium oxide, which may be referred to as lime or quicklime in general terms, may comprise calcium oxide containing magnesium and inorganic materials, in which carbonates, oxides and hydroxides predominate. Hydrated lime may comprise calcium hydroxide including magnesium and inorganic materials, in which carbonates, oxides and hydroxides may predominate. The range of calcium plus magnesium, converted to their oxide equivalents, may be at least 80%.

The plasticizer may comprise a superplasticizer and a liquid reducer. The plasticizer may be manufactured from lignosulfonates, sulfonated naphthalene condensate or sulfonated melamine formaldehyde, or polycarboxylic ethers. The plasticizer may comprise a liquid and/or a solid.

The plasticizer and/or liquid reducer may provide sufficient fluidity and flow properties to the effluent such that the mixture may be pumped to the landfill to form a lift characterized by long term compressive strength. Without wishing to be bound to any particular theory, it is believed that amounts at levels below 0.05% may not provide any significant improvement in the effluent's fluidity and flow properties, and amounts above 2% may cause an adverse impact upon the long term development of compressive strength.

Without wishing to be bound to any particular theory, when the plasticizer is used in the specified amounts in admixture with the other components of the effluent, a self-leveling final product may be obtained. As generally used herein, the term "self-leveling" may refer to material having a slump as defined by the ASTM Slump Test (ASTM C 143-15a). The spread (slump flow) of the mixture may be up to 1000 mm, 25-1000 mm, and 254-810 mm (10-32 inches). Without wishing to be bound to any particular theory, it is believed that the plasticizer may surround a particle in the effluent to be dispersed, and then repulsion forces between each polymer chain of the plasticizer may prevent and/or reduce particle aggregation to provide improved fluidity and flow properties.

The composition may comprise up to 20%, based on the total weight of the composition, one or more alkali additives. The alkali additives may comprise gypsum and/or bottom ash. The composition may comprise up to 20 wt. % gypsum, less than 10 wt. % gypsum, and less than 5 wt. % gypsum. The composition may comprise up to 10 wt. % bottom ash, less than 5 wt. % bottom ash, and less than 3 wt. % bottom ash. Gypsum and/or bottom ash may not be intentionally added to the composition but may be present as incidental impurities in trace amounts in the fly ash.

The composition may comprise up to 8%, based on the total weight of the composition, Portland cement. The composition may be substantially free, essentially free, and completely free of Portland cement. The phrase "substantially free" as used herein refers to the compositions having 8 wt. % or less, "essentially free" means less than 5 wt. % and "completely free" means less than 1 wt. %.

The composition may comprise a powder having a top-size up to 10 mm, such as 6.35 mm, and an average particle size less than 500 micrometers, such as from 20-500 micrometers, and less than 20 micrometers.

The effluent may comprise one or more of ions of sulfite, sulfate, thiosulfate, bicarbonate, carbonate, nitrate, nitrite, fluoride, chloride, calcium, magnesium, sodium, potassium, iron and trace heavy metals and fly ash. Heavy metals may generally comprise at least one of arsenic, selenium, antimony, beryllium, barium, cadmium, chromium, lead, nickel and zinc in elemental form as well as organic and inorganic compounds and salts containing them.

The effluent may comprise greater than 5,000 ppm combined sulfite and sulfate, up to 80 wt. % fly ash, up to 15 wt. % calcium hydroxide, and a balance of incidental impurities. The effluent may comprise 5,000-120,000 ppm combined sulfite and sulfate, up to 80 wt. % fly ash, up to 15 wt. % calcium hydroxide, and a balance of incidental impurities. The effluent may comprise up to 60 wt. % fly ash. The effluent may comprise 0.5-12 wt. % combined sulfite and sulfate.

The effluent may comprise, based on the total weight of the effluent, at least 20% solids and at least 25% liquid, such as up to 60% liquid. The amount of liquid may be sufficient amount of liquid to fill all or substantially all of the interstices in the particulate solids in the mixture comprising the composition and effluent, such as the fly ash, quick lime, and effluent solids so long as the mixture is freely flowable. Without wishing to be bound to any particular theory, the amount of liquid may vary with the proportion of sulfates, sulfites, and other ions in the effluent, the proportion of solids in the effluent, and the intensity of mixing imparted to the mixture comprising the composition and effluent.

The weight ratio of the composition to the effluent may vary depending on the amount of particulate solids, ions, and/or liquid in the effluent. The weight ratio of the composition to the effluent may range from 1:100 to 3:1, 10:100 to 1:1, 20:100 to 0.8:1, and 1:1.

The composition and effluent may form a mixture comprising a paste having a liquid-to-solids ratio of 1:4 to 4:5, such as 1:2 to 7:10. The paste may have sufficient fluidity to be pumped long distances to a landfill without segregation or emitting free liquid to the surface following placement in the landfill. The paste may be soft and malleable. The paste may be pumped to the landfill to cure to be self-supporting.

The paste may cure by 120 days, such as by 90 days, by 60 days, by 30 days, by 7 days, and by 5 days, under atmospheric conditions.

The uncured mixture may comprise up to 60 wt. % liquid, such as up to 50 wt. % liquid, and up to 40 wt. % liquid. For example, the mixture may comprise 20-55 wt. % liquid, such as 30-45 wt. % liquid. The amount of liquid in the mixture may decrease as the mixture cures.

The uncured mixture may comprise, based on the total weight of the mixture, 50-70 wt. %, and 55-65 wt. %, and 60 wt. %, solids. The solids may comprise fly ash, quick lime, hydrated lime, sulfate, sulfite, chlorides, potentially solid plasticizer, trace heavy metals and other suspended and dissolved solids.

The uncured mixture may comprise a high viscosity non-Newtonian paste. The mixture may comprise a viscosity from 1,000 cP to 100,000,000 cP, such as from 10,000 cP to 10,000,000 cP, and 25,000 cP to 500,000 cP.

The uncured mixture may comprise a specific gravity of less than 2 g/cm$^3$, 1-2 g/cm$^3$, and 1.1-1.5 g/cm$^3$.

The cured mixture (i.e., lift) may comprise a permeability less than $10^{-1}$ cm/s, such as less than $10^{-5}$ cm/s and $10^{-5}$ cm/s to $10^{-9}$ cm/s after curing for up to 30 days (e.g., 28 days).

The lift may be characterized as self-supporting. The lift may comprise a solid having a sufficient strength to bear weights and other forces exerted during creating and using the landfill during initial active stages, as well as during later passive stages. The lift may be characterized by compressive strength. The compressive strength (i.e., resistance force), may be determined using a soil penetrometer, such as Model Number H-4205 soil penetrometer from Humbolt Manufacturing or the ELE International Versa-Loader Model Number 25-352 with accompanying readout assemblies.

The lift may comprise a compressive strength of at least 800 lbs. per sq. ft (psf), at least 1600 psf, or greater than 10,000 psf, and 700-1600 psf. After 7 days to cure, the lift may be characterized by a compressive strength of 5.5 psi to greater than 70 psi. For example, the lift may be characterized by a compressive strength of 1000 psf (0.5 ton per square foot) after the paste is cured for 7 days. After 30 days to cure, the lift may be characterized by a compressive strength of 5.5 psi to greater than 70psi. For example, the lift may be characterized by a compressive strength of at least 5.5 psi (792 psf), at least 30 psi (4320 psf), and at least 60 psi (8640 psf) after the paste is cured for 30 days.

The lift may comprise a penetration resistance of at least 0.4 tsf when tested with a Humbolt H-4205 soil penetrometer or alike. The lift may achieve 80% of its final hardness and strength in less than 30 days.

The lift may achieve at least a 10%, at least 25%, at least 50%, or at least 75%, reduction in leachability of at least one heavy metal.

A method for the treatment of flue gas desulfurization scrubber effluent may generally comprise contacting flue gas desulfurization scrubber effluent and a composition for the treatment of flue gas desulfurization scrubber effluent comprising, based on weight percent of the composition, at least 50% fly ash, up to 20% calcium oxide and/or calcium hydroxide, up to 2% plasticizer and/or liquid reducer, and a balance of incidental impurities. The method may comprise forming a mixture of the composition and effluent. The mixture may comprise an aqueous suspension, slurry and/or solution.

The method may comprise wet mixing the composition and effluent. Wet mixing (solid/liquid mixing) may be carried out using a mixer. Examples of a mixer include but are not limited to a kneading mixer, a screw mixer, a cone mixer, a plow mixer, a ribbon blender, a pan Muller mixer, a stirring tank, a helical-blade mixer, an extruder (such as a Rietz, single-screw, or double-screw extruder), and any combinations thereof.

The method may comprise contacting flue gas desulfurization scrubber effluent and a composition for the treatment of flue gas desulfurization scrubber effluent for a time period from 1 second to 1 hour, such as from 5 seconds to 15 minutes. The time may related to the mixing device's efficiency and duration (travel time) in the pipeline to the landfill.

The method may comprise contacting flue gas desulfurization scrubber effluent and a composition for the treatment of flue gas desulfurization scrubber effluent at a temperature of less than 100° C., such as greater than 0° C. and less than 100° C., from 10-70° C., 15-60° C., and 20-50° C.

A method for the treatment of flue gas desulfurization scrubber effluent generally comprising contacting flue gas desulfurization scrubber effluent and the composition as generally described herein for a sufficient period of time to form the non-Newtonian paste; pumping the paste to a landfill; and curing the paste under ambient conditions to form a first lift that is self-supporting and structurally sound to support a second lift.

EXAMPLE

The compositions and methods of use described herein may be better understood when read in conjunction with the following representative example. The following example is included for purposes of illustration and not limitation.

A composition for the treatment of flue gas desulfurization scrubber effluent comprising, based on weight percent of the composition, about 80-98% fly ash, up to about 20% calcium oxide and/or calcium hydroxide, up to about 2% plasticizer and/or liquid reducer and a balance of incidental impurities is mixed with a flue gas desulfurization scrubber effluent. The weight ratio of the composition to the effluent is about 1:1. No additional water is added. The mixture of the composition and effluent is mixed in a pugmill mixer for about 5 seconds to about 15 minutes at about 10-70° C. to produce a paste that is characterized as relatively homogeneous and non-Newtonian behavior. The paste is pumped to a landfill to form a layer about three feet deep and allowed to cure for about five days at ambient conditions to form the lift.

All documents cited herein are incorporated herein by reference, but only to the extent that the incorporated material does not conflict with existing definitions, statements, or other documents set forth herein. To the extent that any meaning or definition of a term in this document conflicts with any meaning or definition of the same term in a document incorporated by reference, the meaning or definition assigned to that term in this document shall govern. The citation of any document is not to be construed as an admission that it is prior art with respect to this application.

While particular embodiments have been illustrated and described, it would be obvious to those skilled in the art that various other changes and modifications can be made without departing from the spirit and scope of the invention. Those skilled in the art will recognize, or be able to ascertain using no more than routine experimentation, numerous equivalents to the specific apparatuses and methods described herein, including alternatives, variants, additions, deletions, modifications and substitutions. This application including the appended claims is therefore intended to cover all such changes and modifications that are within the scope of this application.

What is claimed is:

1. A non-Newtonian fluid comprising a composition for the treatment of flue gas desulfurization scrubber effluent and flue gas desulfurization scrubber effluent having greater than 5000 ppm of at least one of dissolved sulfite and dissolved sulfate, wherein the non-Newtonian fluid further comprises:
    a liquid-to-solids ratio of about 1:4 to 4:5;
    a viscosity from about 1,000 cP to about 100,000,000 cP;
    a specific gravity of less than about 2 $g/cm^3$;
    a permeability less than $10^{-5}$ cm/s; and
    a compressive strength of at least 700 psf when cured to be self-supporting.

2. The non-Newtonian fluid of claim 1, wherein the liquid-to-solids ratio is from 1:2 to 7:10.

3. The non-Newtonian fluid of claim 1, wherein the viscosity is from 10,000 cP to 10,000,000 cP.

4. The non-Newtonian fluid of claim 1, wherein the viscosity is from 25,000 cP to 500,000 cP.

5. The non-Newtonian fluid of claim 1, wherein the specific gravity is from 1 $g/cm^3$ to 2 $g/cm^3$.

6. The non-Newtonian fluid of claim 1, wherein the specific gravity is from 1.1 $g/cm^3$ to 1.5 $g/cm^3$.

7. The non-Newtonian fluid of claim 1, wherein the permeability is from $10^{-5}$ cm/s to $10^{-9}$ cm/s.

8. The non-Newtonian fluid of claim 1, wherein the compressive strength is at least 10,000 psf when cured to be self-supporting.

9. The non-Newtonian fluid of claim 1 comprising flue gas desulfurization scrubber effluent and having a ratio of the composition to the flue gas desulfurization scrubber effluent from 1:100 to 3:1.

10. The non-Newtonian fluid of claim 9, wherein the non-Newtonian fluid is cured by 30 days under ambient conditions.

11. The non-Newtonian fluid of claim 9, wherein the non-Newtonian fluid is cured by 5 days under ambient conditions.

12. The non-Newtonian fluid of claim 9, wherein the composition reduces the leachability of at least one heavy metal from the flue gas desulfurization scrubber effluent by at least 10%.

13. The non-Newtonian fluid of claim 1, wherein the ratio of the composition to the flue gas desulfurization scrubber effluent, based on weight percentage, is from 10:100 to 1:1.

14. The non-Newtonian fluid of claim 1, wherein the ratio of the composition to the flue gas desulfurization scrubber effluent is from 20:100 to 0.8:1.

15. The non-Newtonian fluid of claim 1, wherein the ratio of the composition to the flue gas desulfurization scrubber effluent is 1:1.

16. The non-Newtonian fluid of claim 1, wherein the composition comprises, based on weight percent of the composition:
    80-98% fly ash,
    2-20% calcium oxide and/or calcium hydroxide,
    greater than zero and up to 2% plasticizer, and
    a balance of incidental impurities.

17. A method for the treatment of flue gas desulfurization scrubber effluent comprising:
    contacting flue gas desulfurization scrubber effluent and the composition of claim 16 for a sufficient period of time to form the non-Newtonian paste;
    pumping the paste to a landfill; and
    curing the paste under ambient conditions to form a first lift that is self-supporting and structurally sound to support a second lift.

18. The non-Newtonian fluid of claim 1, wherein the composition comprises, based on weight percent of the composition:
    83. 5-98% fly ash,
    2-18% calcium oxide and/or calcium hydroxide,
    greater than zero and up to 1.5% plasticizer, and
    a balance of incidental impurities.

19. The non-Newtonian fluid of claim 1, wherein the composition consists of, based on weight percent of the composition:
    87-98% fly ash,
    6-12% calcium oxide,
    greater than zero and up to 1% plasticizer, and
    a balance of incidental impurities.

* * * * *